(12) United States Patent
Eldar et al.

(10) Patent No.: US 9,838,432 B2
(45) Date of Patent: Dec. 5, 2017

(54) SYSTEM AND METHOD FOR AUTOMATIC DATA PROTECTION IN A COMPUTER NETWORK

(71) Applicant: Secure Islands Technologies Ltd., Beit-Dagan (IL)

(72) Inventors: Yuval Eldar, Shoham (IL); Roee Oz, Tel Aviv (IL)

(73) Assignee: Secure Islands Technologies Ltd (IL)

( * ) Notice: Subject to any disclaimer, the term of this patent is extended or adjusted under 35 U.S.C. 154(b) by 0 days.

(21) Appl. No.: 14/872,585

(22) Filed: Oct. 1, 2015

(65) Prior Publication Data

US 2016/0028772 A1    Jan. 28, 2016

Related U.S. Application Data (63) Continuation of application No. 12/527,427, filed as application No. PCT/IL2007/001079 on Sep. 2, 2007, now Pat. No. 9,218,500.

(Continued)

(51) Int. Cl.
*G06F 7/00* (2006.01)
*G06F 13/00* (2006.01)
(Continued)

(52) U.S. Cl.
CPC .......... *H04L 63/20* (2013.01); *G06F 21/6218* (2013.01); *H04L 63/105* (2013.01);
(Continued)

(58) Field of Classification Search
CPC ... H04L 63/20; H04L 63/105; H04L 63/0428; G06F 21/6218; G06F 2221/2141; G06F 2221/2101
(Continued)

(56) References Cited

U.S. PATENT DOCUMENTS 6,202,091 B1 * 3/2001 Godse .................. G06F 9/4408
709/220
6,317,838 B1   11/2001 Baize
(Continued)

FOREIGN PATENT DOCUMENTS

DE           10152121         5/2003

OTHER PUBLICATIONS

Neil F. Doherty et al, Aligning the information security policy with the strategic information systems plan, Elsevier Ltd., 2005.*
(Continued)

*Primary Examiner* — Shanto M Abedin
(74) *Attorney, Agent, or Firm* — Workman Nydegger (57) ABSTRACT

A method of protecting data items in an organizational computer network, including, defining multiple information profiles for classifying the data item, defining rules for protecting the data item belonging to a specific information profile, classifying the data item according to the defined information profiles, applying a protection method to the data item responsive to the classification and the defined rules, automatically updating the classification of the data item responsive to a change in the content or location of the data item; and automatically transforming the applied protection method, throughout the lifecycle of the data item, responsive to a change in classification or location of the data item, according to the defined rules.

22 Claims, 5 Drawing Sheets

| # | INFORMATION PROFILE | SENSITIVITY | SOURCE | DESTINATION | ACTION | TRACK |
|---|---|---|---|---|---|---|
| INFO STAGE: CREATE/EDIT | | | | | | |
| 1 | CREDIT CARDS | TOP SECRET | | ALL DOMAIN USERS | MS RMS PROTECTION POLICY: INTERNAL ONLY TEMPLATE | LOG |
| 2 | FINANCE DATA | SECRET | | FINANCE GROUP | MS RMS PROTECTION POLICY: FINANCE ONLY TEMPLATE | LOG |
| 3 | HUMAN RESOURCE DATA | TOP SECRET | | ALL DOMAIN USERS | ORACLE STELLENT IRM PROTECTION POLICY: HR ONLY | ALERT |
| 4 | R&D DATA | SECRET | | ALL DOMAIN USERS | E-DRM PROTECTION POLICY: RnD ONLY | NONE |
| 5 | EXECUTIVE ONLY DATA | TOP SECRET | | EXECUTIVE GROUP | PASSWORD PROTECT | LOG |
| 6 | EXECUTIVE ONLY DATA | TOP SECRET | | ALL DOMAIN USERS | MS RMS PROTECTION POLICY: INTERNAL ONLY TEMPLATE | ALERT |
| 7 | PARTNER DATA | RESTRICTED | | ALL DOMAIN USERS | PKI | NONE |
| 8 | ENTERPRISE PORTAL DATA | RESTRICTED | | ALL DOMAIN USERS | MS RMS PROTECTION POLICY: INTERNAL ONLY TEMPLATE | NONE |
| 9 | CRM DATA | CONFIDENTIAL | | ALL DOMAIN USERS | MS RMS PROTECTION POLICY: INTERNAL ONLY TEMPLATE | LOG |
| INFO STAGE: TRANSFER | | | | | | |
| 1 | FINANCE DATA | SECRET | FINANCE GROUP | KPMG DOMAIN | PGP | LOG |
| 2 | R&D DATA | SECRET | RnD GROUP | \RnD REP\CLEAR CASE | DECRYPT | LOG |
| 3 | CRM DATA | TOP SECRET | EXECUTIVES GROUP | DISK ON KEY | PASSWORD PROTECT | LOG |
| 4 | ANY | TOP SECRET | EXECUTIVES | IM | ALLOW APPLICATION | LOG |

500

Related U.S. Application Data (60) Provisional application No. 60/903,304, filed on Feb. 26, 2007.

(51) Int. Cl.
*H04L 29/06* (2006.01)
*G06F 21/62* (2013.01)

(52) U.S. Cl.
CPC ............... *G06F 2221/2101* (2013.01); *G06F 2221/2141* (2013.01)

(58) Field of Classification Search
USPC .................. 713/165, 166, 167; 726/1, 26–30
See application file for complete search history.

(56) References Cited

U.S. PATENT DOCUMENTS

| | | | |
|---|---|---|---|
| 7,444,506 | B1 | 10/2008 | Datta et al. |
| 7,716,716 | B1 | 5/2010 | Boystun |
| 7,734,600 | B1 | 6/2010 | Wise et al. |
| 7,827,294 | B2 | 11/2010 | Merkow et al. |
| 7,840,992 | B1 | 11/2010 | Dufrene et al. |
| 7,891,001 | B1 | 2/2011 | Greenawalt et al. |
| 7,958,147 | B1 | 6/2011 | Turner et al. |
| 8,037,290 | B1* | 10/2011 | Stutton ................ G06F 21/575 713/1 |
| 8,127,366 | B2 | 2/2012 | Vainstein et al. |
| 8,381,297 | B2* | 2/2013 | Touboul ............... G06F 21/562 713/164 |
| 2002/0174352 | A1 | 11/2002 | Dahl |
| 2003/0105734 | A1 | 6/2003 | Hitchen et al. |
| 2004/0054896 | A1 | 3/2004 | Himmel et al. |
| 2004/0059931 | A1 | 3/2004 | Fulkerson et al. |
| 2004/0123145 | A1 | 6/2004 | Baffes et al. |
| 2004/0172550 | A1 | 9/2004 | Sai |
| 2005/0033757 | A1 | 2/2005 | Greenblatt et al. |
| 2005/0066165 | A1* | 3/2005 | Peled ................... G06F 21/316 713/165 |
| 2005/0138081 | A1 | 6/2005 | Alshab et al. |
| 2005/0204404 | A1 | 9/2005 | Hrabik et al. |
| 2005/0251573 | A1* | 11/2005 | Merkow ............... G06F 21/602 709/226 |
| 2005/0274792 | A1 | 12/2005 | Hahn-Carlson |
| 2005/0283824 | A1 | 12/2005 | Nakamura et al. |
| 2005/0289358 | A1 | 12/2005 | Haselden et al. |
| 2006/0004819 | A1* | 1/2006 | Claudatos ......... G06F 17/30085 |
| 2006/0041445 | A1 | 2/2006 | Aaron |
| 2006/0048224 | A1* | 3/2006 | Duncan ............... G06F 21/6218 726/22 |
| 2006/0120526 | A1* | 6/2006 | Boucher ............. G06F 21/6218 380/247 |
| 2006/0123233 | A1* | 6/2006 | Aaron ................ G06F 21/6218 713/166 |
| 2006/0259950 | A1 | 11/2006 | Mattsson |
| 2006/0288207 | A1 | 12/2006 | Brown et al. |
| 2007/0079117 | A1 | 4/2007 | Bhogal et al. |
| 2007/0113266 | A1* | 5/2007 | Ross ...................... G06F 21/10 726/1 |
| 2007/0136397 | A1* | 6/2007 | Pragada ............ G06F 17/30082 |
| 2007/0143824 | A1 | 6/2007 | Shahbazi |
| 2007/0174909 | A1* | 7/2007 | Burchett ............... G06F 21/602 726/18 |
| 2007/0192385 | A1 | 8/2007 | Prahlad et al. |
| 2008/0209553 | A1* | 8/2008 | Lu ....................... G06F 12/1433 726/22 |

OTHER PUBLICATIONS

"International Search Report and Written Opinion for PCT Application No. PCT/IL07/01079," dated Jul. 25, 2008.

Indian Office Action issued in Indian Application No. 5955/DELNP/2009 dated Mar. 27, 2017.

"Office Action Issued in European Patent Application No. 07805539.9", dated Jan. 29, 2016, 5 Pages. (MS# 346333.03).

"Office Action Issued in European Patent Application No. 07805539.9", dated Aug. 18, 2017, 4 pages.

* cited by examiner

| # | INFORMATION PROFILE | SENSITIVITY | SOURCE | DESTINATION | ACTION | TRACK |
|---|---|---|---|---|---|---|
| INFO STAGE: CREATE/EDIT | | | | | | |
| 1 | CREDIT CARDS | TOP SECRET | | ALL DOMAIN USERS | MS RMS PROTECTION POLICY: INTERNAL ONLY TEMPLATE | LOG |
| 2 | FINANCE DATA | SECRET | | FINANCE GROUP | MS RMS PROTECTION POLICY: FINANCE ONLY TEMPLATE | LOG |
| 3 | HUMAN RESOURCE DATA | TOP SECRET | | ALL DOMAIN USERS | ORACLE STELLENT IRM PROTECTION POLICY: HR ONLY | ALERT |
| 4 | R&D DATA | SECRET | | ALL DOMAIN USERS | E-DRM PROTECTION POLICY: RnD ONLY | NONE |
| 5 | EXECUTIVE ONLY DATA | TOP SECRET | | EXECUTIVE GROUP | PASSWORD PROTECT | LOG |
| 6 | EXECUTIVE ONLY DATA | TOP SECRET | | ALL DOMAIN USERS | MS RMS PROTECTION POLICY: INTERNAL ONLY TEMPLATE | ALERT |
| 7 | PARTNER DATA | RESTRICTED | | ALL DOMAIN USERS | PKI | NONE |
| 8 | ENTERPRISE PORTAL DATA | RESTRICTED | | ALL DOMAIN USERS | MS RMS PROTECTION POLICY: INTERNAL ONLY TEMPLATE | NONE |
| 9 | CRM DATA | CONFIDENTIAL | | ALL DOMAIN USERS | MS RMS PROTECTION POLICY: INTERNAL ONLY TEMPLATE | LOG |
| INFO STAGE: TRANSFER | | | | | | |
| 1 | FINANCE DATA | SECRET | FINANCE GROUP | KPMG DOMAIN | PGP | LOG |
| 2 | R&D DATA | SECRET | RnD GROUP | \RnD REP\CLEAR CASE | DECRYPT | LOG |
| 3 | CRM DATA | TOP SECRET | EXECUTIVES GROUP | DISK ON KEY | PASSWORD PROTECT | LOG |
| 4 | ANY | TOP SECRET | EXECUTIVES | IM | ALLOW APPLICATION | LOG |

SYSTEM AND METHOD FOR AUTOMATIC DATA PROTECTION IN A COMPUTER NETWORK

CROSS REFERENCE TO RELATED APPLICATIONS

This application is a continuation of U.S. application Ser. No. 12/527,427 filed Nov. 4, 2009, which is a U.S. national stage of International Application No. PCT/IL2007/001079 filed Sep. 2, 2007 which designates the United States and claims the benefit of prior U.S. Provisional Application No. 60/903,304, filed Feb. 26, 2007. The entire disclosures of said applications are incorporated herein by reference.

FIELD OF THE INVENTION

The present invention relates generally to a system and method for automatically protecting data in a computer network and specifically in a corporate environment.

BACKGROUND OF THE INVENTION

The personal computer revolution has introduced a big challenge in protecting data in the corporate environment. In the past corporations were computerized by central mainframe computers or by mini computers. These systems had complete control of access to the data within them. Any attempt to access data was verified by the central computer and the central computer could prevent transfer of data to non-desired places. In contrast nowadays corporate data is generally accessed by personal computer networks, which are connected in many cases to external networks, for example the Internet. Each station generally stores data locally in various forms, for example as word processing files, spreadsheet files, emails and other forms. The end stations typically comprise less secure devices than the terminals that served the central computers, for example a desktop computer, a laptop computer or an external email account at an email provider. Data can easily be transferred out of the system with or without leaving information regarding the identity of the person that took the data, for example a person may copy the data to various types of removable media (e.g. a writeable CD, a writeable DVD, a floppy disk, or a disk-on-key). A person can also email data to an external email account and then access the data remotely.

The above described situation leaves the corporate data in a less secure state than in the past. Many scenarios can lead to information leakage either deliberately or accidentally, for example theft of a desktop computer, theft or loss of laptop computers, loss of a disk-on-key or other removable media. Additionally, an employee can easily send information to an external email provider and retrieve it using an external computer without any corporate limitations.

Various solutions have been suggested to tackle different aspects of protecting corporate information:

One method to tackle the problem is by installing network sniffers at strategic positions, for example next to a network firewall, to monitor content that leaves the corporate network. Typically a sniffer may reassemble TCP sessions and analyze the content to detect sensitive information leakage and trace it back to the sender. A few problems with this solution is that it is limited to information transmitted over the network and does not deal with other forms of information leaks such as copying information to a USB device. Additionally, the monitoring by the sniffer can easily be overcome by manipulating the data, for example by using encryption so that the sniffer cannot determine the content. Further additionally, since the method only detects data, which is detected by the algorithms implemented by the sniffer it does not detect all information leaks and is thus limited in its ability to enforce a policy.

A second method of tackling the problem is by installing an agent program on the computers of the corporate employees. The agent can monitor and control use of data, for example the copy and transmission of files from the computer, printing out content of a file, burning CDs and other actions. One drawback with this solution is that the agent may be circumvented by booting from a different operating system to gain control of the data on the disk without being limited by the agent program. Also once information leaves the employees station it is not protected.

A third method to tackle the problem is by implementing an enterprise digital rights management (E-DRM) system to provide persistent encryption to the corporate data. Typically all controlled data files are encrypted and they can only be accessed through the use of an application which runs in the background and enforces an access policy, for example requiring an access key or preventing a user from copying the data. The advantage of E-DRM over the use of an agent is that access policies can be enforced even after delivering the content to a recipient and stolen files cannot be accessed. However there are a few problems in implementing E-DRM in the real world:

1. Many systems need the information in its unencrypted form to function properly, for example relational data bases, tape backups, search engines, and applications which manipulate the data. Thus all these systems must incorporate the E-DRM application to function with the data. This puts a severe limitation on the hardware and software, which can be used and generally would increase their cost.

2. When dealing with external partners that need to access the information, for example an external corporate accountant or attorney or an outsourcing company, they too would need to implement the encryption system to access the data. However, it can be quite complicated to implement a key management system, which provides keys across multiple enterprises/bodies. Additionally, working with E-DRM puts a burden on the external entities. They may not be interested in installing specific software and/or implementing more complex procedures to deal with the data of the specific client.

3. In E-DRM and other persistent encryption mechanisms the author of a file is generally provided with the option to define, which policies to enforce on the file, for example to prevent printing or prevent copying excerpts (e.g. by cut and paste) from the file. Each author can implement different policies, which will cause confusion for the users of data in the corporation since they will not know ahead of time what actions can be applied to a specific data file.

Generally, systems for protecting data, protect data at a specific position in the network (e.g. preventing access to the content of a server by unauthorized users) or by applying protection when performing a specific action with the data (e.g. creating the data item and applying an encryption or transferring the data out of the network and applying an encryption).

SUMMARY OF THE INVENTION

An aspect of an embodiment of the invention, relates to a system and method for protecting data in a corporate network throughout the life cycle of the data. In an exemplary embodiment of the invention, when a data item is created or changed in the system, it is automatically classified to define an information profile according to which it will be treated. Some examples of data items are files, mail messages, web pages and buffers that hold content such as for implementing "cut and paste" and "drag and drop" operations.

In an exemplary embodiment of the invention, the information profile associated with the data item defines a protection method, which includes sets of rules that will be applied to the data item dynamically. Optionally, the protection method is affected by a few basic characteristics, namely: the nature of the data item defined by the information profile (e.g. confidential data, trade secret data, and public knowledge data), the location of the data item in the system (e.g. on a server database, on an endpoint nonvolatile medium such as a workstation disk, or on a removable media), the user accessing the data item (e.g. corporate manager, employee, visitor) and the location to which the data item is transferred.

In an exemplary embodiment of the invention, once an information profile is defined for the data item a protection method can be applied to the data item based on the rules governing the protection method associated with the information profile. Optionally, if any of the characteristics related to the data item are changed the protection method is changed correspondingly, for example if the data item is copied from the disk of an endpoint to a disk-on-key the protection method may be changed for example from an E-DRM protection form to a password protected encrypted form.

In an exemplary embodiment of the invention, when a data item is altered or edited the information profile associated with it may be updated and its protection method may be altered accordingly.

In an exemplary embodiment of the invention, the system includes a protection management server to aid in the implementation of the data protection method. Optionally, application of a protection method to an item may be performed at the endpoint (e.g. at a workstation, laptop, PDA, Blackberry, smart phone, etc.), at the host, or at the terminal server hosting the data item. Alternatively, application of the protection method may be performed on a server/appliance which intercepts data items between sources to a target location. Alternatively or additionally, both alternatives can coexist in the same environment.

There is thus provided according to an exemplary embodiment of the invention, a method of protecting data items in an organizational computer network, including: defining multiple information profiles for classifying the data item; defining rules for protecting the data item belonging to a specific information profile; classifying the data item according to the defined information profiles; applying a protection method to the data item responsive to the classification and the defined rules; automatically updating the classification of the data item responsive to a change in the content or location of the data item; and automatically transforming the applied protection method, throughout the lifecycle of the data item, responsive to a change in classification or location of the data item, according to the defined rules. Optionally, the protection method takes into account the location of the data item. In an exemplary embodiment of the invention, the protection method takes into account the user accessing the data item. Optionally, the data item is classified based on analysis of the content of the data item. In an exemplary embodiment of the invention, the data item is classified based on analysis of metadata associated with the data item. Optionally, the data item is classified based on analysis of the events, which led to the creation of the data item.

In an exemplary embodiment of the invention, the rules define a protection method transformation responsive to the source and destination of the data item. Optionally, the rules define a protection method transformation responsive to the current protection method applied to the data item. In an exemplary embodiment of the invention, the rules define a protection method transformation responsive to the identity of the transmitter and the receiver of the data item. Optionally, the rules define a protection method transformation responsive to the identity of the transmitter and the location of the receiver of the data item. In an exemplary embodiment of the invention, the rules define a protection method transformation responsive to the identity of the transmitter and the application receiving the data item. Optionally, the rules define a protection method transformation responsive to the identity of the transmitter and the media of the location receiving the data item.

In an exemplary embodiment of the invention, the rules define a protection method transformation responsive to the identity of the transmitter and the peripheral device receiving the data item. Optionally, the transformation of the protection method of the data item is logged to a log file. In an exemplary embodiment of the invention, the transformation of the protection method of the data item generates a notification to a user describing the method of accessing the data item with the new protection method. Optionally, the protection method prevents unauthorized access to the content of the data item. In an exemplary embodiment of the invention, the protection method verifies the integrity of the data item. Optionally, the protection method prevents unauthorized duplication of the content of the data item. In an exemplary embodiment of the invention, the protection method requires a password to access the data item.

In an exemplary embodiment of the invention, the protection method comprises encryption of the data item. Optionally, the protection method comprises manipulation of the data. In an exemplary embodiment of the invention, the protection method prevents the transmission of the data. Optionally, the transformation is performed by an agent application that is installed on a local endpoint of the computer network. In an exemplary embodiment of the invention, the transformation is performed by transmitting the data item to a server of the computer network. Optionally, the data item cannot be accessed until the applied protection is performed responsive to a matching of one of the defined rules.

There is additionally provided according to an exemplary embodiment of the invention, a system for protecting data items in an organizational computer network, including: a protection management server for recording information profiles; an administration console for defining rules for protecting data items belonging to a specific profile; an agent application for installing on endpoints to enforce data protection; wherein the agent application is adapted to classify the data items to a specific information profile upon their creation or change; wherein the agent is adapted to automatically enforce a protection method on the data item according to the defined rules that apply based on the profile classification that is applied to the data item; and wherein the agent is adapted to update the enforced protection method applied to the data item throughout the lifecycle of the data item responsive to a change in classification or location of the data item, according to the rules.

BRIEF DESCRIPTION OF THE DRAWINGS

The present invention will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION OF PREFERRED EMBODIMENTS

Figure 1:
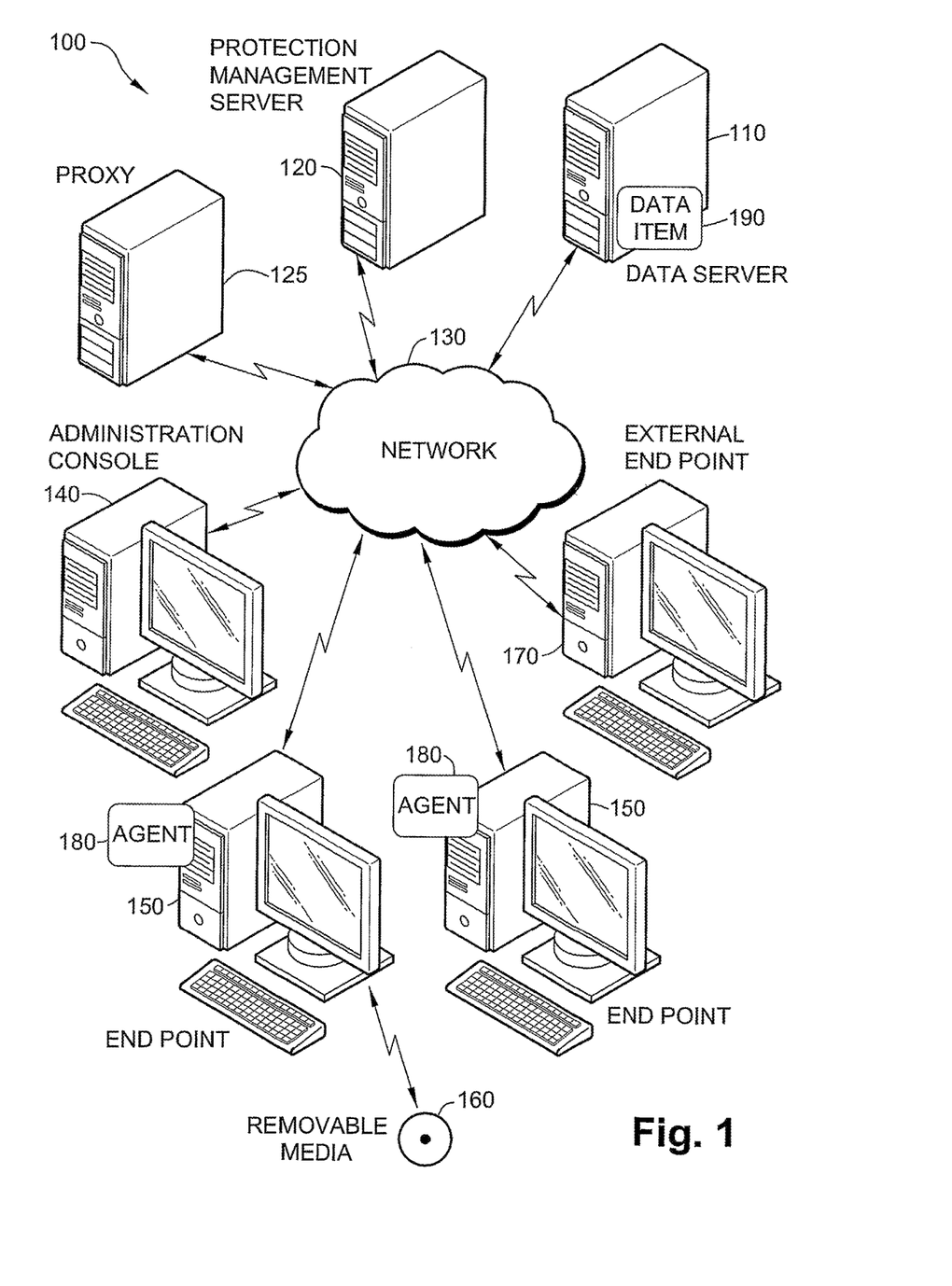
FIG. 1 is a schematic illustration of a system for automatic data protection in a computer network, according to an exemplary embodiment of the invention.

FIG. 1 is a schematic illustration of a system 100 for automatic data protection in a computer network, according to an exemplary embodiment of the invention. In an exemplary embodiment of the invention, system 100 is implemented on the computational resources of an organization. Optionally, the organization may be a small office with a single endpoint or an enterprise company with multiple physical locations connected together by a network 130. Some endpoints are connected by a local area network or other types of networks and are controlled by the organization, and some endpoints may be connected via a wide area network, which is not controlled by the organization (e.g. the Internet). In an exemplary embodiment of the invention, the computational resources of the organization may include one or more endpoints 150 for the employees of the organization to work on. Additionally, system 100 may include a data server 110, which stores data items 190 and serves as a server for endpoints 150. Optionally, anagent software 180 is installed on each endpoint 150 that belongs to the organization to enforce data protection as implemented on system 100.

In an exemplary embodiment of the invention, system 100 automatically controls protection of every data item 190 used in system 100 from its creation through its alteration until it is destroyed and no longer accessible. Optionally, the protection method applied to protect data items 190 may be altered based on the content of data item 190, the location of data item 190 and the user accessing data item 190.

In an exemplary embodiment of the invention, a protection management server 120 is connected to network 130 to manage data protection in network 130. In some embodiments of the invention, data server 110 may serve as protection management server 120 by installing a software application on data server 110, without adding a dedicated hardware device to serve as the protection management server. In some embodiments of the invention, a dedicated endpoint serves as an administrator console 140 to provide instructions to protection management server 120, thus increasing security by preventing access from any other endpoint. Alternatively, any endpoint 150 may be able to access protection management server 120 and serve as the administrator if the user provides appropriate credentials. Optionally, data items 190 may also be sent to external endpoints 170, which are used by people that are not employees of the organization, and may or may not allow installation of an agent software application on their endpoint to control access to data item 190. Optionally, system 100 handles data item 190 according to instructions from the administrator and may prevent employees from accessing and/or distributing information freely without some method of protection. In an exemplary embodiment of the invention, each data item 190 will be protected by a protection method according to the sensitivity of the information (i.e. based on the information profile), so that it will remain protected against intentional and unintentional attempts to be transferred or exposed to an unauthorized receiver. Optionally, one protection method is employed when an employee accesses data item 190 and a different protection method is employed if the employee emails data item 190 to a user in a different organization. Additionally, one protection method can be employed when the user accesses data item 190 on data server 110 and a different protection method can be employed if data item 190 is copied to the employees endpoint 150 or is copied to various types of removable media 160, for example a disk-on-key, a CDR, a writable DVD, a paper printout and other forms.

Optionally, in special cases the administrator can release a data item 190, for example by making a special rule for the information profile that the data item belongs to.

Figure 2:
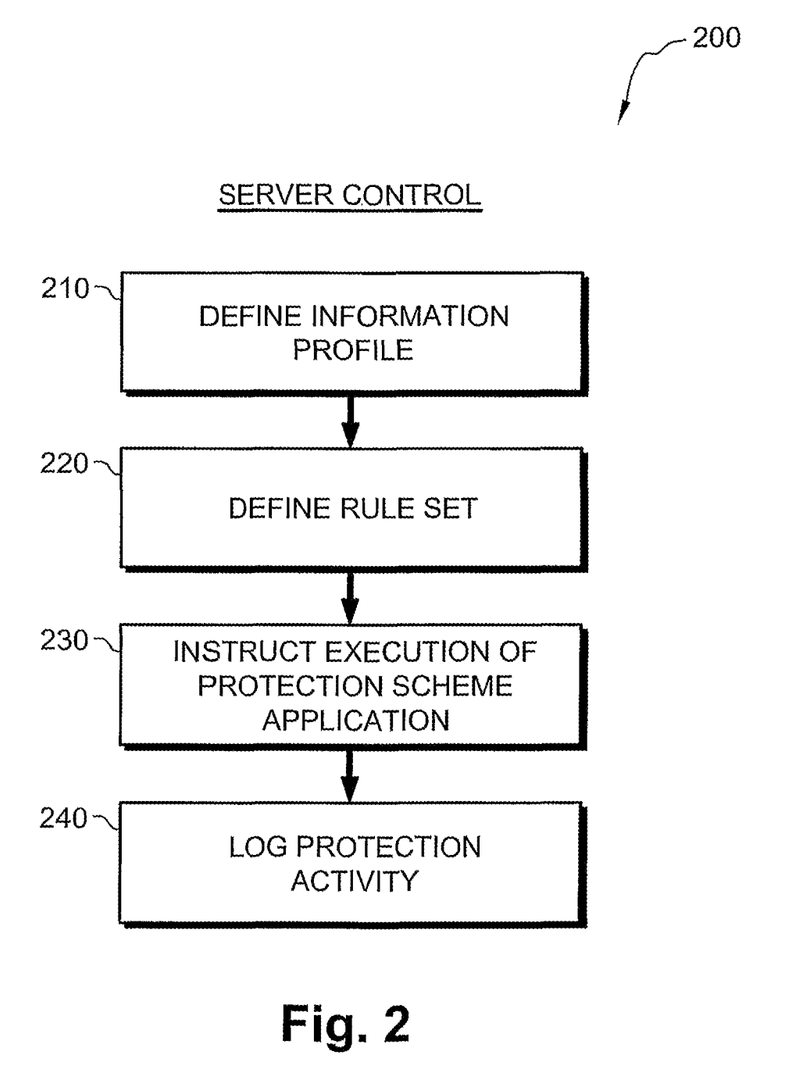
FIG. 2 is a flow diagram of details defined for a protection management server, according to an exemplary embodiment of the invention.
Figure 5:
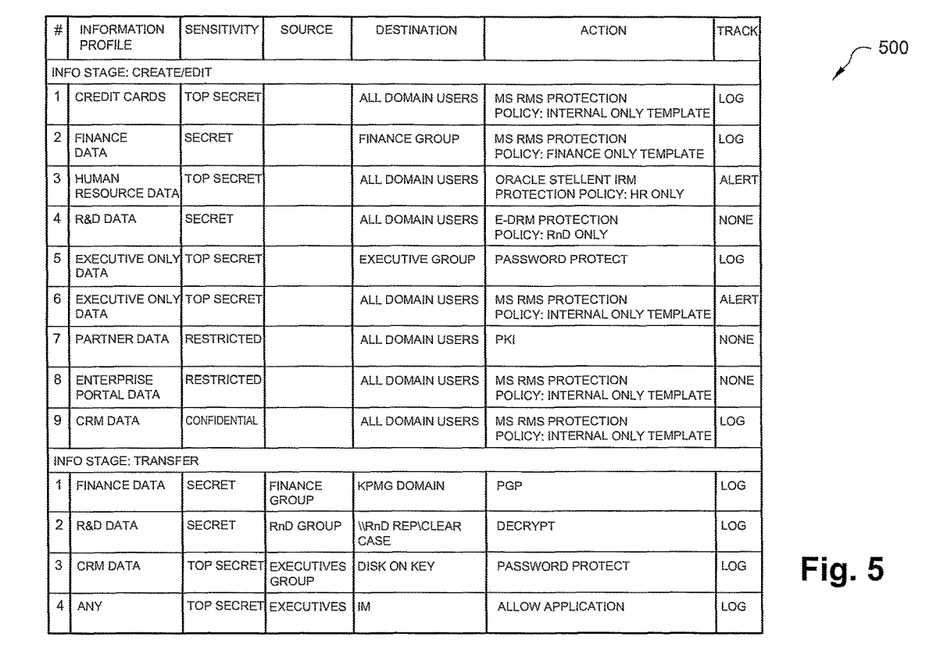
FIG. 5 is a table of exemplary information profiles and rules for dealing with data items belonging to the information profiles, according to an exemplary embodiment of the invention.

FIG. 2 is a flow diagram 200 of details defined for a protection management server 120, according to an exemplary embodiment of the invention. In an exemplary embodiment of the invention, an administrator originally programs protection management server 120 with definitions of different types of information profiles (210). Optionally, any data item 190 created in the organization will be classified to belong to one or more of the information profiles. FIG. 5 is a table 500 of exemplary information profiles and rules for dealing with data items 190 belonging to the information profiles, according to an exemplary embodiment of the invention. Following is a list of exemplary information profiles as illustrated in FIG. 5:

1. Credit Cards—a data item 190 that contain credit card numbers. This information is optionally identified based on content analysis of data item 190 or using a regular expression with a credit card pattern. Optionally, a data item in which this information appears multiple times, for example more than ten times, would be flagged as a credit card data item.
2. Finance data—a data item 190 that includes confidential information which is of economic importance regarding the organization, and should be available only to authorized employees. Optionally, finance data includes data that arrives from an accounting or auditor associate, for example via email. Additionally, finance data may include data that is derived from the accounting system of the organization. The accounting system may be a web based application or a client based application or files that are retrieved from a specific directory, for example from a directory named //finance/finance reports.
3. Human resource (HR) data—a human resource data item may include data items 190 disclosing information which is related to personal details of the employees of the company. Optionally, the data may be derived from an HR module of an Enterprise application.

4. Research and development (R&D) data—a data item 190, which is related to the research and development projects of the organization. Optionally, this includes information, which is of importance to the organization and the organization is interested in keeping secret. Some examples of indication that may be used to identify such data are files in MS "vsd" format and files that retrieved from the development file libraries of the organization.

5. Executives Only Data—data items 190, containing information which should only be seen by top ranking personnel that have been authorized to see the information.

6. Partner data—data items 190, containing information—regarding corporate partners or data that is transmitted or received from business partners of the organization.

7. Enterprise Portal Data—Data which is derived from intranet Web sites such as enterprise portals.

8. CRM Data—Customer records that are derived from the Customer Relationship Management system of the organization. Optionally, CRM data contains sensitive information such as names, Social Security Numbers, Addresses, and phone numbers of corporate clients and suppliers.

In an exemplary embodiment of the invention, to determine one or more appropriate information profiles for categorizing data item 190, various methods are employed, for example:

1. Content analysis—analyzing the content of data item 190 for key words, specific phrases, regular expressions, natural language processing or using other known classifier engines that analyze content.

2. Metadata analysis—analyzing metadata regarding data item 190, for example the name of the file, the type of file (e.g. word document, excel document, email message, picture file, movie file).

3. Event analysis—analyzing the event which brought about the existence of data item 190, for example being cut from a different item, where the item was placed (e.g. network location (URL), directory name), where the item was retrieved from or downloaded from, who created the item, which application created the item. As an example the administrator can define that all information from a specific source or created by a specific person or application will belong to a specific information profile.

In an exemplary embodiment of the invention, data item 190 may be assigned multiple information profiles. Alternatively, system 100 may select the most stringent or least stringent profile to represent data item 190, for example if an item belongs to two data profiles: a "finance data-profile" that is defined as secret and an "executives only data-profile" that is defined as "top secret", system 100 will optionally select the "executives only data-profile" if it is designed to select the most stringent one. Optionally, if the multiple profiles' have the same security level system 100 selects one randomly or selects the first match to the rules of the profiles (e.g. as shown in FIG. 5), for example as commonly implemented by network firewalls.

In an exemplary embodiment of the invention, once information profiles are defined the administrator needs to define sets of rules (220) which are to be applied to data item 190 based on the information profiles assigned to data item 190, and an action (e.g. an encryption form) that is to be applied to data item 190 defined by the following characteristics:

1. The source location of data item 190.
2. The destination location of data item 190.

In some embodiments of the invention, the location (either for the source or destination) may be a physical location such as a Disk-on-key, a CD drive, a specific library on a hard disk. Optionally, the location may be given by a Uniform Resource Locator (URL), or by other Universal Naming Conventions (UNC). Alternatively the location may be a logical location, for example based on a user identity or the identity of a group of users, for example "Finance Group" is construed to mean any place or data item 190 that is accessible by a finance group member. Another type of location can be an application (or group of applications) from which the data item is extracted or transferred to.

Optionally, more complex rules may take other characteristics into consideration, for example: the user accessing data item 190, the user that is to receive data item 190, and the current protection method applied to data item 190 or the access time. When a rule is said to be matched agent 180 will take action according to the rule.

Following is a list of exemplary action methods, which may be applied by the rule set to achieve the goals described above, according to an exemplary embodiment of the invention:

1. Implementing a protection policy for a data item using third party E-DRM products, for example Microsoft RMS5 EMC Authentica, Oracle Stellent/SealedMedia, Adobe Livecycle Rights Management and others. These products encrypt data item 190 and allow the definition of a policy, which is enforced on the user of the content, for example the policy may limit the number of uses, limit the identity of the user or limit the number of computers data item 190 can be used on. In some cases the receiver must contact an EDRM management server, or even maintain a live connection with an EDRM management server to receive permission to access data item 190.

2. Implementing proprietary or third party file based persistent encryption. The system can incorporate any persistent encryption mechanism and operate it on controlled data items, for example products like PGP, Voltage, Utimaco or even a proprietary encryption can be supplied with the appropriate application program interfaces (APIs).

3. Manipulation of the data, this includes semantic form conversion, for example conversion of a file from a text file to a PDF file or graphic file so the content cannot easily be edited with a similar application as used to create data item 190.

4. Setting the protection policy in a PDF file to prevent copy or print of the file.

5. Protect the item with a password, so that the user must know the password to gain access to data item 190.

6. Password protected zip archive to condense the size of data item 190 and prevent access without knowledge of the password.

7. Password protected Microsoft Office Document to prevent access without knowledge of the password.

8. PGP encryption and key management solutions to provide a strong encryption to data item 190 and provide a secure key transfer.

9. Apply a digital signature to data item 190 to assure that it was sent by the listed sender.

10. Apply a CRC check to data item 190 to verify that the file has not been altered.

11. Attach a disclaimer or warning to data item 190 to be brought to the attention of the recipient.

12. A mixture of two or more of the above methods, or other methods.

13. Removing any protection.

Optionally, responsive to any action performed on data item 190 by a user of system 100, protection management server 120 will instruct execution of protection method adaptation (230) to the protection method applied to data item 190 as defined by the rule set described above.

Examples of these rules are shown in FIG. 5. In an exemplary embodiment of the invention, the rule set is divided into two sections referred to as information stages (Info Stages). The first Info Stage is Create/Edit which applies when a data item is to be created or edited at a destination location. The second Info Stage contains rules that are applied when a data item which belongs to a specific info profile is transferred from a source location to a destination location.

In an exemplary embodiment of the invention, actions taken in system 100 may be tracked, for example classifying a data item 190, implementing protection on a data item 190, and/or changing the protection on a data item 190. Optionally, tracking may include logging to agent 180, or sending a message to protection management server 120. If protection management server 120 is not available, messages may be stored at agent 180 to be transferred at a later time. Optionally, at protection management server 120 tracking may include logging (240) the change to a system log. Alternatively or additionally, tracking may include sending an alert to an administrator to take an immediate action or a delayed action. Further alternatively or additionally, tracking may include sending a notification to a specific user or a group of users. In some embodiments of the invention, administration console 140 may allow access to review tracking logs and/or other messages sent by any agent 180. In a first example for Info Stage create/edit, when data items that are categorized to the credit cards information profile are edited or created at a location associated with any domain user, an action of applying MS RMS Protection Policy will take place. This policy is to define a policy template that allows only internal corporate users to review the data item.

In a second example for Info Stage create/edit, when data items that are categorized to the finance data information profile are created at locations associated with users of the finance group (e.g. when the data item is being edited by a member of the finance group), an action of MS RMS Protection Policy will take place. This policy is to define a policy template that only finance users can review the data items.

In a third example for Info Stage create/edit, when data items that are categorized to the human resource (HR) data profile are created at a location associated with any domain user, an action of implementing Oracle Stellent IRM Protection Policy will take place. This policy is to define a policy template that allows only HR users to review the data items.

In a fourth example for Info Stage create/edit, when data items that are categorized to the executives only data profile are created at locations associated with members of the executive group, an action of password protection will be implemented on the data items.

In a fifth example for Info Stage create/edit, when data items that categorized to executives only data profile are created at logical location that are accessible to all users of the domain, an action of MS RMS Protection Policy will be implemented. This policy is to define a policy template that only members of the executive group can review the data items. Optionally, if more than one rule can be applied the first rule in sequence will be applied.

FIG. 5 also shows 4 exemplary rules for Info stage-transfer. The first exemplary rule for Info Stage-transfer, shows data items that categorized to a finance data profile that are transferred by a finance group user to an email address of a finance partner company (e.g. KPMG international that provides audit, tax and advisory services). Optionally, in such a case the protection method is changed from MS RMS Protection Policy:FinanceOnlyTemplate to PGP. When other users that do not belong to the finance group will send this data item to KPMG or any other partner company, the protection method will remain MS RMS Protection Policy:FinanceOnlyTemplate without any protection transformation, thus only finance members can transfer data item 190, and only to members of KPMG.

The second exemplary rule for Info Stage—transfer, shows data items that are categorized as belonging to a R&D data profile. The rule provides that such data items when transferred from locations associated with R&D group users to a location associated with a member of the R&D group (e.g. \\RnDRep\ClearCase, which is a shared directory of a repository that holds design documents for members of the R&D group). Optionally, the rule requires that the content will be converted to decrypted form in order to be able to allow control of the versions of the documents. This rule provides that the protection method will be transformed, for example from E-DRM Protection with a Policy:RnDOnly to decrypted form.

The third example for Info Stage-transfer shows a rule that provides that data items that are categorized as CRM data that are transferred from a location associated with an executives group member to a Disk on Key, the protection method is transformed from MS RMS Protection Policy: FinanceOnlyTemplate to Password Protect.

The fourth example for Info Stage-transfer shows a rule that provides that data items that are categorized to any information profile, if they are transferred from an executive group location to an Instant Messaging (IM) application they will be transferred without any protection. Thus, when a user that belongs to the executives group wants to do a copy/paste operation from a protected data items to an IM application, he/she will be able to do so. All other users will be blocked. In an exemplary embodiment of the invention, the goals of the protection method enforced by the rule set may vary, for example:

1. To prevent unauthorized access to the data.
2. To monitor and or record access to the data.
3. To limit access to the data to a specific station/user (i.e. to prevent further distribution) or to limit access to a specific number of times.
4. To allow a user to view the content of data item 190 but not alter data item 190.
5. To prevent the user from making a hard copy of the content of data item 190.
6. To verify that the file content has not been altered.
7. To verify that a specific user sent the data item.
8. To communicate securely with partners and customers.

Figure 3:
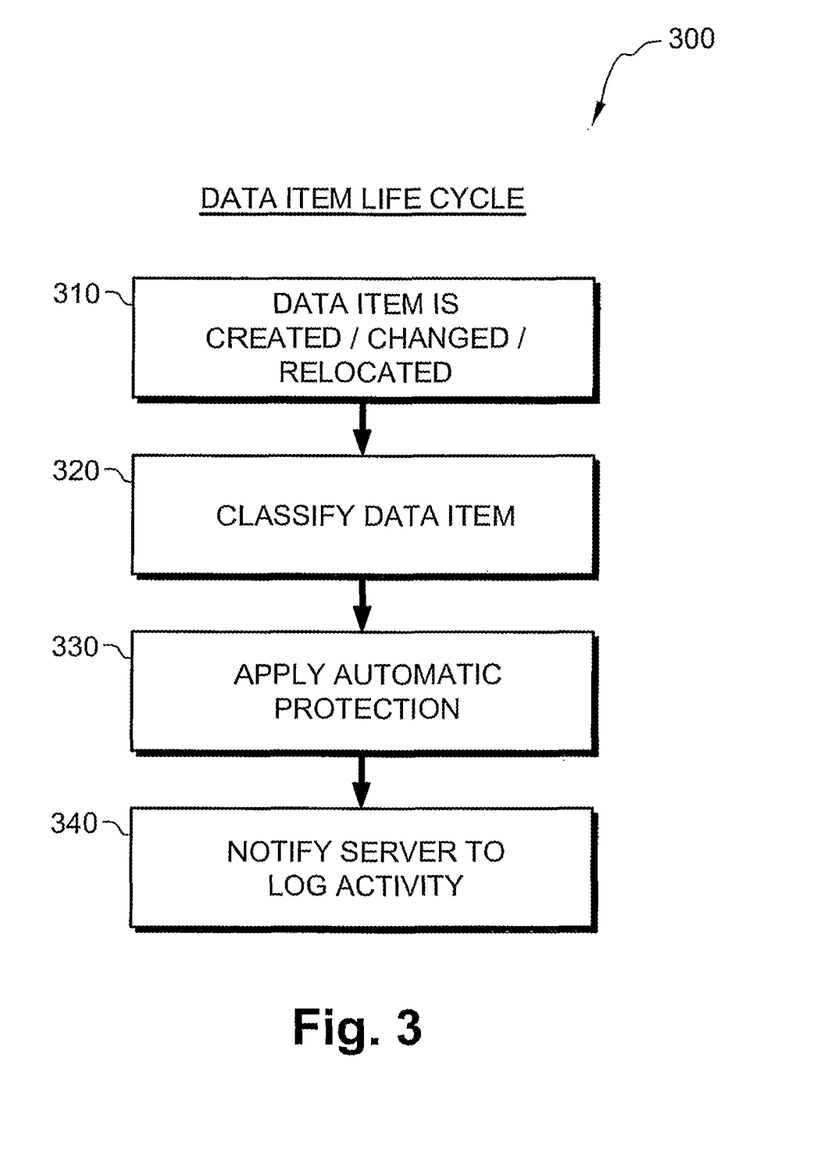
FIG. 3 is a flow diagram of the life cycle of a data item, according to an exemplary embodiment of the invention.

FIG. 3 is a flow diagram 300 of the life cycle of data item 190, according to an exemplary embodiment of the invention. In an exemplary embodiment of the invention, agent 180 automatically enforces a protection policy whenever a data item 190 is created, changed or relocated (310), for example when creating a new file with an application, when editing a file, when creating an email, when copying content to a temporary buffer, when moving or copying a file from one location to another. Optionally, to enforce the policy agent 180 classifies (320) data item 190 as described above, or verifies that the current classification does not need to be changed, for example due to adding or omitting content. In an exemplary embodiment of the invention, agent 180 automatically applies (330) one or more protection methods (e.g. convert to PDF and add a password) to data item 190. In some embodiments of the invention, the host of data item 190 applies the transformation of the protection method, for example data items 190 on server 110 are transformed by server 110, and data items 190 on endpoint 150 are transformed by endpoint 150. Alternatively, agent 180 may transfer data item 190 to a proxy 125 that transforms data item 190 for agent 180 and forwards it to its destination with a protection method applied. It should be noted that data item 190 may be protected by one method when located in one location and by another method when located at a different location, for example a file on server 110 may be unprotected since access to server 110 may be limited by access control lists that require users to login before being given access to files on the server. In contrast the same file when copied to endpoint 150 may be transformed to be password protected (as in the fifth exemplary rule for info stage create/edit described above) since access control is not applied to the files on the endpoint and the endpoint is generally kept in a less protected physical environment relative to a corporate server.

In an exemplary embodiment of the invention, agent 180 notifies (340) protection management server 120 whenever a transformation is applied to data item 190. Optionally, as explained above the notification may be logged to the protection management server 120. Alternatively, it may cause protection management server 120 to initiate an alert (e.g. by email or by SMS) to an administrator to take actions or protection management server 120 may send notification (e.g. by email or SMS) to various users updating them regarding the transformation, for example sending them a password or description of the method required to access the content of data item 190. In some embodiments of the invention, agent 180 prompts the user for a password or notifies the user upon automatically selecting a password for the user. Optionally, the user may provide agent 180, ahead of time with one or more passwords to be applied in various circumstances, for example a password for all emails sent by the user to people from outside the organization. In an exemplary embodiment of the invention, the user notifies the recipient of the email as to the password that was selected, for example in a different email or by other means such as by telephone, fax or SMS.

In some embodiments of the invention, agent 180 is updated by protection management server 120 whenever there are changes to the rule set for enforcing protection of data items 190. Alternatively, whenever endpoint 150 is booted up or periodically, agent 180 polls protection management server 120 for rule updates. In some embodiments of the invention, when agent 180 is initially installed on an endpoint 150 it scans the entire disk, classifies and defines a protection method for every available item. Alternatively, only items that are accessed after installing agent 180 are checked. In some embodiments of the invention, agent 180 is also installed on data server 110 so that data items 190 on data server 110 will be classified even before being accessed by a user.

Figure 4:
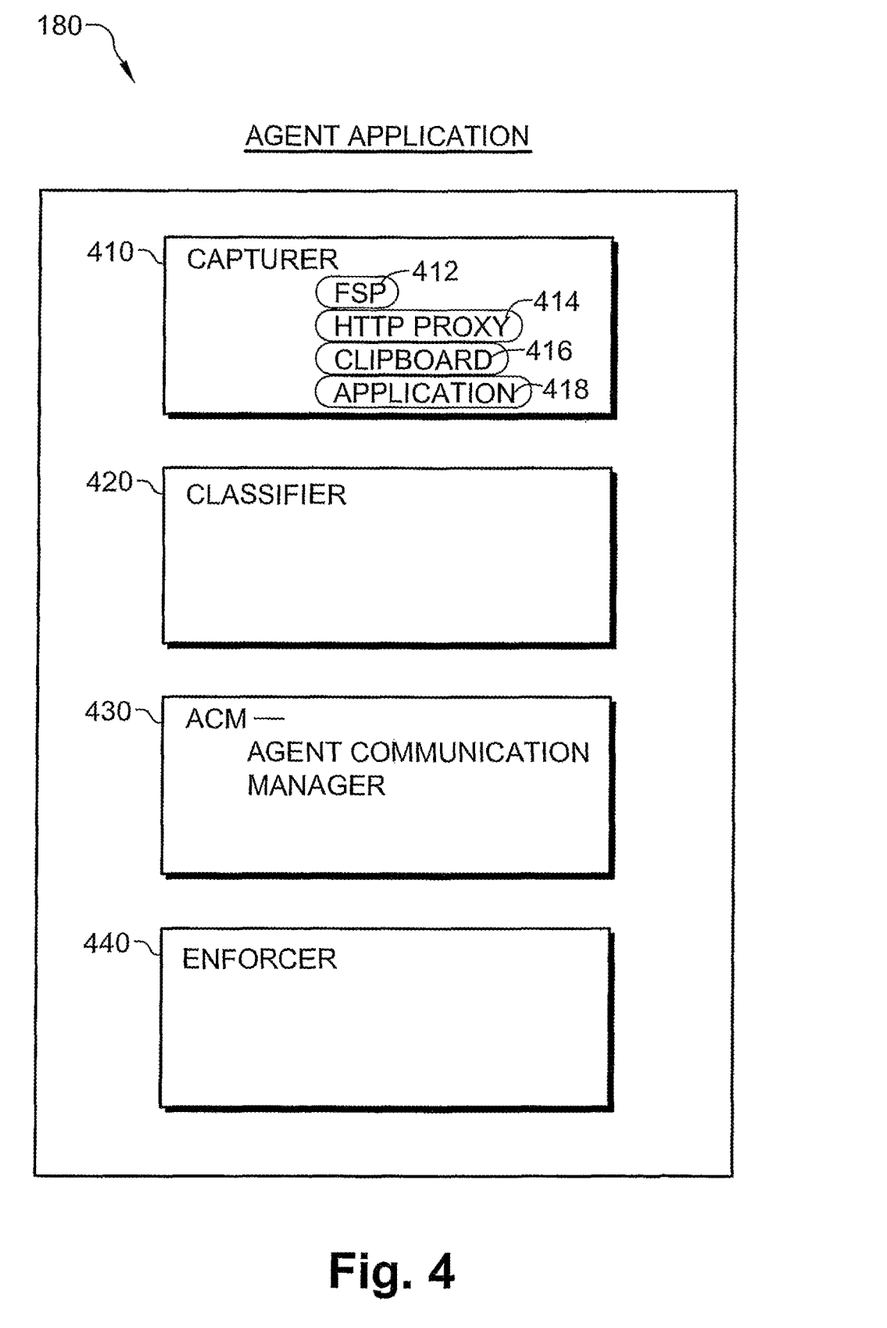
FIG. 4 is a schematic illustration of the elements of an agent application for implementing automatic data protection, according to an exemplary embodiment of the invention.

FIG. 4 is a schematic illustration of the elements of an agent application 180 for implementing automatic data protection, according to an exemplary embodiment of the invention. In an exemplary embodiment of the invention, agent software 180 includes 4 main parts to assure implementation of a protection policy on data items in network 130. Namely the 4 main parts are:

1. A capturer 410;
2. A classifier 420;
3. An agent communication manager (ACM) 430; and
4. An enforcer 440.

In an exemplary embodiment of the invention, content capturer 410 is required to take control of all content access on endpoint 150 to enforce the protection policy. In some embodiments of the invention, agent 180 only deals with specific content, for example data files and ignores files that are not of interest to system 100 (e.g. executable files). Optionally, capturer 410 includes various parts as required to handle any method or device by which content can be accessed or can enter and/or exit endpoint 150. A first method, which needs to be controlled is the access of data through the file system of endpoint 150, for example when a file is accessed by a user double clicking on the file, or by copying the file from one location to another. Optionally, capturer 410 implements a file system proxy (FSP) 412 which takes control of the file system interrupts and handles all file access including access to network files.

In an exemplary embodiment of the invention, FSP 412 supports four scenarios when accessing network files:
1. Downloading from a shared folder in the network to endpoint 150.
2. Uploading to a shared folder in the network from endpoint 150.
3. Accessing a file located in the network (e.g. to view or edit its content).
4. Copying a file from one location in the network to a different location in the network.

Optionally, FSP 412 includes a kernel mode file system filter driver and a user mode application. The filter driver intercepts open/create requests and checks if the request is directed to a monitored location. If the location is monitored the filter intercepts I/O operations from the user application. The filter then copies the file to an intermediate location, which may be volatile or nonvolatile, for example on the local disk of the user, and communicates with the user application to provide controlled access to the file.

In an exemplary embodiment of the invention, the user mode application initiates a classification process to determine the appropriate classification for the file. Optionally, protection is applied to the intermediate work file according to the policy rules for the determined classification. The filter then redirects file system calls (e.g. read requests) to the intermediate protected file as if it was located at the network location. Further details regarding the use of an intermediate file are described below. When the program accessing the file finishes, the filter driver closes the original file and closes and deletes the intermediate file.

A similar process is performed when uploading a file to a network location or working with a file directly from the network location.

Optionally, some functions that are described as the user mode implementation can be performed at the kernel mode and vise versa.

In some embodiments of the invention, some of the functions performed by FSP 412 are performed by proxy 125 instead of agent 180.

A second method by which content can be accessed at endpoint 150 is through the HTTP protocol (e.g. via an HTTP web browser). Optionally, agent 180 implements an HTTP proxy 414 to control content that is accessed through HTTP. Optionally, HTTP proxy 414 may be part of the agent application or may be a separate entity in the network (e.g. proxy 125). In a similar manner network protocols other than HTTP may be supported, for example FTP.

Following is an example of the use of HTTP proxy 414:

When accessing a monitored HTTP address, a networking filter component checks its redirection table, for example in MS windows this can be implemented through LSP, TDI, Kernel Sockets, NDIS or other components that can intercept network connections. The filter amends the address to the address of an HTTP proxy (e.g. an Apache Proxy). The proxy gets the request and classifies the content of the web page. The proxy then provides the content in its protected form to the HTTP proxy 414. Optionally, redirection is implemented either by the kernel mode filter or through the user mode process.

A third method by which content can be controlled is through the clipboard, for example when a user cuts or copies content from one place and pastes it in another. Optionally agent 180 implements a clipboard handler 416 by hooking into the clipboard system. An example of this is using a system hook on windows OS and capturing the WM_CHANGECB CHAIN notification. Optionally, agent 180 classifies the data stored by the clipboard and if data is defined to be protected, agent 180 places a redirector object instead in the clipboard. Optionally, when a process requests the data from the clipboard, the request is delegated to agent 180, which decides if to provide the data to the requesting process, according to the rules defined for the classification of the data and the classification of the destination data item into which the data is to be pasted. In some cases the protection scheme applied to the target document is changed with or without giving warning to the user before pasting the data into the target document. Alternatively, agent 180 may block the pasting process altogether. Optionally, the classification of the resulting data item 190 is updated to reflect the results of the pasting process.

A fourth method by which content can be accessed is by using a "drag and drop" operation, for example to move text between documents. Optionally, agent 180 controls "drag and drop" handling by hooking into the "drag and drop" handler of the operating system. In MS windows this may be implemented by placing a hidden window under the cursor, and analyzing the motion of the mouse. Optionally, after determining the details of the "drag and drop" process that is invoked the event can be handled like "cut and paste."

A fifth method for controlling content access is by providing an application plugin 418 to control content access in various applications, for example MS office, Outlook Express, Internet Explorer or other known applications. Optionally, an application plugin can provide capturer 410 with capabilities specific to the application to ensure that a data item 190 cannot be manipulated other than according to the policy of system 100, for example cannot be printed without authorization. In some embodiments of the invention, capturer 410 may include other parts to control access to content on endpoint 150.

In an exemplary embodiment of the invention, once capturer 410 of agent 180 intercepts a data item 190 it provides the item to classifier 420. Classifier 420 determines a classification for data item 190 as described above. In some embodiments of the invention, classifier 420 first checks to see if data item 190 was previously classified, for example data item 190 that was created by a different user and transmitted to the current user, would optionally already be classified. Optionally, the previous classification is either attached to the data item 190, for example by adding an information profile tag to the file (e.g. embedded in the file data in a hidden form, in a metadata section of the file or in a metadata section of the file system). Alternatively, it can be implemented by a separate database, for example on protection management server 120, by holding a key, which represents a hash of data item 190 or a URI, which identifies data item 190 within system 100.

After determining the classification, agent 180 determines if any rules are applicable to the action being performed by the user, for example if a change in the protection method is required. Optionally, agent 180 uses ACM 430 to communicate with a server communication manager (SCM) on protection management server 120 to retrieve the policy rules that are currently defined. As mentioned above agent 180 may retrieve the rules at various times, for example for every transaction, periodically, or when initially loading agent 180.

Once the classification of data item 190 is determined and policy rules are obtained; agent 180 uses enforcer 440 to enforce the rules of the policy set for data items 190 with the determined classification. Enforcer 440 determines where data item 190 is coming from, where data item 190 is going, which protection method is to be applied and then enforcer 440 enforces the rules of the policy by applying or transforming the protection method for data item 190.

In an exemplary embodiment of the invention, enforcer 440 applies the protection method without intervention of the user. Optionally, enforcer 440 invokes a protection application and obtains certification to be able to remove the protection method from data item 190 and apply a different protection method. In some embodiments of the invention, enforcer 440 provides a master key or generates an application dedicated master key to apply the protection method. Optionally, enforcer 440 stores the key at protection management server 120 so that it may be accessed by other agents 180 if necessary to change the protection applied to data item 190. Optionally, the protection application handles the master key as any other key that is managed, and agent 180 is responsible to apply the key on data item 190.

As an example, RMS protection policy is applied by the use of a special master key that is provided to enforcer 440 by the RMS application. Upon installation agent 180 creates the master key for RMS using the standard RMS software developer kit (SDK). Optionally, the master key is created by the use of a dedicated system domain user. In some embodiments of the invention, the master key is created in a way that binds it to a specific machine as an RMS item that is protected against tampering. This reduces the threat of abusing the master key by taking it and using it on another machine. Optionally, RMS builds a protection policy template, which is a collection of rights defining: which users can view the data item, which users can edit it, print it and so forth. In Oracle IRM the policy template is called a Context. In an exemplary embodiment of the invention, some or all of agents 180 may use the master key to remove and apply protection schemes. Optionally, agent 180 protects the master key so that it cannot be used directly by a user or an application without control by agent 180.

An example of implementation of automatic data protection by agent 180 is to make a copy of a file that is protected by an RMS protection method from data server 110 to removable media 160. Optionally, if the user is authorized (e.g. a manager) enforcer 440 will transform the protection method to a password protected file so that the file can be used outside of network 130, for example as shown by rule 3 of info stage-transfer in FIG. 5. However if the user is not authorized, for example that there is no transformation rule that matches this transaction (e.g. in the example above only the executives group has a rule), the file will remain protected by the RMS protection method and the user will not be able to access the file on a computer external to the organization from removable media 160. Additionally, a user in the organization that does not belong to the executives group will not be able to access the data even if the user can see the file. An additional example is a user that wishes to copy information from a text document (e.g. word) into an application (e.g. an instant messaging application as shown by rule 4 of Info Stage-Transfer in FIG. 5). Optionally, the recognition of an application is done through an OS capturer that analyzes the checksum (like MD5) of the execution file of the application or alternatively the file name of the application. Further alternatively, an application can be validated by its signature. Optionally, some users may be permitted to copy and paste the information, whereas others may be prohibited from doing so (for example as shown by rule 4 of Info Stage-transfer in FIG. 5). In some embodiments of the invention, the policy rules differentiate between the types of device and may even differentiate between devices manufactured by one manufacturer relative to another. In some embodiments of the invention, the policy rules differentiate between the Mac address of the sending or receiving endpoint 150, and set different actions accordingly. In an exemplary embodiment of the invention, proxy 125 or a dedicated server serves as a mail server proxy for system 100, to handle all outgoing and incoming mail instead or in addition to handling them with agents 180. Optionally, the mail server proxy enforces handling of all outgoing messages and incoming messages according to the requirements of system 100. In an exemplary embodiment of the invention, agent 180 when installed on endpoint 150 or on data server 110 controls emails and/or any other types of communication. Optionally, agent 180 may control emails by intercepting mail protocols (e.g. using the same technique as HTTP proxy 414 and/or provide application plug-ins 418 for email applications (e.g. Outlook, outlook express, Incredimail) to enforce policy rules on outgoing or incoming emails, for example to classify and apply/transform protection on emails.

In an exemplary embodiment of the invention, agent 180 serves as a virtual proxy between the source and destination of data item 190. Optionally, one side may access data item 190 in one form and the other side may access data item 190 in another form, for example a file is stored on data server 120 in decrypted form but the policy rules define that the user be provided the file in an RMS encrypted form (e.g. as shown according to rule 4 of Info Stage—Create/Edit and rule 2 of Info Stage-Transfer in FIG. 5, when the file is handled by All Domain Users, it will be protected by E-DRM protection policy of R&D only, and only transformed to decrypt form when it is located at location WRnD REP\ClearCase). In an exemplary embodiment of the invention, agent 180 provides each side with data item 190 in the form designated for the respective side according to the policy rules, and agent 180 shields the content of data item 190 from being accessed by the other side in the wrong form. Optionally, agent 180 keeps a temporary work area with parts of data item 190 in encrypted form so that it cannot be accessed by an unauthorized entity. In an exemplary embodiment of the invention, agent 180 uses a block encryption, wherein each block arrives at agent 180 in a first form. Agent 180 optionally encrypts the block to protect it while it is stored at agent 180, and agent 180 transforms the block to the other form when providing it to the other side. Optionally, at any given moment, agent 180 may have the entire file in an internal encrypted form, but does not have more than a single block in the forms of either side to protect the content from being accessed by an unauthorized user, for example a user that is provided the file in encrypted form will extract data item 190 in decrypted form from the temporary work area of agent 180. In some embodiments of the invention, agent 180 creates in the temporary work area, an intermediate file with the entire content of the original file. Optionally, agent 180 applies the same encryption to the intermediate file as applicable to the user accessing the file, so that the user does not have access to a less protected form on his/her endpoint.

In an exemplary embodiment of the invention, the above method for dealing with data items with different protection methods on each side is applied when copying or moving data item 190 from one location to another and also for accessing a remote data item 190 by an application, for example to edit a word file located on data server 120 using MS Word or to access data from a database located on data server 120 using a financial application.

In some embodiments of the invention, agent 180 verifies its integrity and the integrity of data server 110 and/or protection management server 120 to prevent a user from constructing a fraudulent network to gain access to protected data. In an exemplary case, data item 190 is kept in decrypted form on data server 110 and is provided in encrypted form to endpoint 150. Optionally, the user can borrow endpoint 150 and connect it to a mock data server (e.g. with the same names and addresses as data server 110), then the user can store a copy of data item 190 to the mock data server using agent 180 and retrieve it in decrypted form. Optionally, to prevent this, agent 180 performs a mutual authentication (e.g. using Kerberos or other domain verification methods, which authenticate with protection management server 120) to verify the identity of the servers every time it is turned on, or for every transformation of data to prevent such fraud.

In some embodiments of the invention, agent 180 can function even when not connected to the network once the policy information from protection management server 120 is downloaded. Optionally, agent 180 may prepare a log file to update protection management server 120 when reconnected to the network.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

It will be appreciated by persons skilled in the art that the present invention is not limited to what has been particularly shown and described hereinabove. Rather the scope of the present invention is defined only by the claims, which follow.

The invention claimed is:

1. A computer system comprising:
   one or more processors; and
   one or more computer readable hardware storage devices having stored thereon computer-executable instructions, the computer-executable instructions being executable by the one or more processors to cause the computer system to automatically manage and protect a first data item in an organizational computer network by implementing and maintaining a protection method that is applied to that first data item throughout various instances of that first data item's lifecycle by causing the computer system to:

create a plurality of information profiles, wherein each information profile defines a set of policies that are usable to control access to data items;

assign at least one information profile to the first data item, wherein the at least one information profile defines a particular set of policies for the first data item;

cause an agent component of the computer system to poll a protection management server to check for any updates to the particular set of policies, wherein checking for the updates is performed at least each time the computer system performs a boot up;

after receiving a response from the protection management server, apply said any updates;

apply the particular set of policies to the first data item such that access to the first data item is controlled by the particular set of policies; and in response to identifying a transformation to the first data item, cause a notification to be sent to an identified user of the first data item, the notification describing a new access method for accessing content of the first data item, the new access method being implemented in response to the transformation.

2. The computer system of claim 1, wherein the computer-executable instructions further cause the computer system to:

in response to the identifying of the transformation to the first data item, update the particular set of policies.

3. The computer system of claim 2, wherein the update to the particular set of policies is logged to a log file.

4. The computer system of claim 1, wherein a determination as to which information profile to assign to the first data item is at least partially based on metadata associated with the first data item.

5. The computer system of claim 1, wherein how the access to the first data item is controlled is at least partially based on a location of the first data item.

6. The computer system of claim 1, wherein how the access to the first data item is controlled is at least partially based on a level of sensitivity associated with the first data item.

7. The computer system of claim 1, wherein multiple information profiles are assigned to the first data item such that each assigned information profile includes a corresponding set of policies, and wherein a determination as to which set of policies to apply during a particular use of the first data item is at least partially based on a type of action that a current user attempts to perform while using the first data item.

8. The computer system of claim 7, wherein a first set of policies is applied when the current user attempts to copy the first data item, and wherein a second set of policies is applied when the current user attempts transfer the first data item.

9. The computer system of claim 1, wherein the computer-executable instructions further cause the computer system to:

periodically check for updates to the particular set of policies.

10. The computer system of claim 1, wherein, in response to determining that the first data item was previously assigned an information profile, the previously assigned information profile is either:

attached to the first data item by adding an information profile tag to the first data item; or applied to the first data item using a database.

11. The computer system of claim 1, wherein the computer-executable instructions further cause the computer system to:

periodically examine the first data item; and in response to a detected change of the first data item, assign a new set of policies to the first data item.

12. The computer system of claim 1, wherein a determination as to which information profile to assign to the first data item is at least partially based on a content of the first data item.

13. The computer system of claim 1, wherein a determination as to which information profile to assign to the first data item is at least partially based on a sensitivity level of the first data item, and wherein attempts to access the first data item by a current user are classified as either intentional or unintentional.

14. The computer system of claim 1, wherein the at least one information profile further includes a special rule that is usable only for the first data item, wherein the special rule is defined by an administrator, and wherein the special rule is usable to release the first data item.

15. The computer system of claim 1, wherein multiple information profiles are assigned to the first data item such that each assigned information profile includes a corresponding set of policies, and wherein a determination as to which set of policies to apply during a particular use of the first data item is at least partially based on one or more of the following:

a type of action that a current user attempts to perform while using the first data item;

a stringency level associated with the information profile;

a random selection requirement;

a first match requirement; or a sequence requirement.

16. A method, implemented by a computer system that includes one or more processors, for automatically managing and protecting a data item in an organizational computer network by implementing and maintaining a protection method that is applied to that data item throughout various instances of that data item's lifecycle, the method comprising:

creating a plurality of information profiles, wherein each information profile defines a set of policies that are usable to control access to data items;

assigning at least one information profile to a first data item, wherein the at least one information profile defines a particular set of policies for the first data item;

causing an agent component of the computer system to poll for a protection management server to check for any updates to the particular set of policies, wherein checking for the updates is performed at least each time the computer system performs a boot up;

after receiving a response from the protection management server, applying said any updates;

applying the particular set of policies to the first data item such that access to the first data item is controlled by the particular set of policies; and in response to identifying a transformation to the first data item, causing a notification to be sent to an identified user of the first data item, the notification describing a new access method for accessing content of the first data item, the new access method being implemented in response to the transformation.

17. The method of claim 16, wherein multiple information profiles are assigned to the first data item such that each assigned information profile includes a corresponding set of policies, and wherein a determination as to which set of policies to apply during a particular use of the first data item is at least partially based on a type of action that a current user attempts to perform while using the first data item.

18. The method of claim 16, wherein, in response to determining that the first data item was previously assigned an information profile, the previously assigned information profile is either:
   attached to the first data item by adding an information profile tag to the first data item; or
   applied to the first data item using a database.

19. The method of claim 16, wherein the method further includes:
   in response to the identifying of the transformation to the first data item, updating the particular set of policies.

20. One or more hardware storage devices having stored thereon computer-executable instructions that are executable by one or more processors of a computer system to cause the computer system to automatically manage and protect a data item in an organizational computer network by implementing and maintaining a protection method that is applied to that data item throughout various instances of that data item's lifecycle by causing the computer system to:
   create a plurality of information profiles, wherein each information profile defines a set of policies that are usable to control access to data items;
   assign at least one information profile to a first data item, wherein the at least one information profile defines a particular set of policies for the first data item;
   cause an agent component of the computer system to poll a protection management server to check for any updates to the particular set of policies, wherein checking for the updates is performed at least each time the computer system performs a boot up;
   after receiving a response from the protection management server, apply said any updates;
   apply the particular set of policies to the first data item such that access to the first data item is controlled by the particular set of policies; and
   in response to identifying a transformation to the first data item, cause a notification to be sent to an identified user of the first data item, the notification describing a new access method for accessing content of the first data item, the new access method being implemented in response to the transformation.

21. The computer system of claim 1, wherein controlling access to the first data item by the particular set of policies includes identifying an attempt to perform semantic form conversion on the first data item.

22. The computer system of claim 1, wherein the first data item is a file, and wherein the computer-executable instructions further cause the computer system to:
   after determining that the first data item includes a previous classification, cause the previous classification to be embedded within the first data item in a hidden form.

* * * * *